Oct. 11, 1949.  R. P. ALEX  2,484,141
SKIN STRESSED LAMINATED FIBERGLAS ROTOR BLADE
Filed Jan. 9, 1947
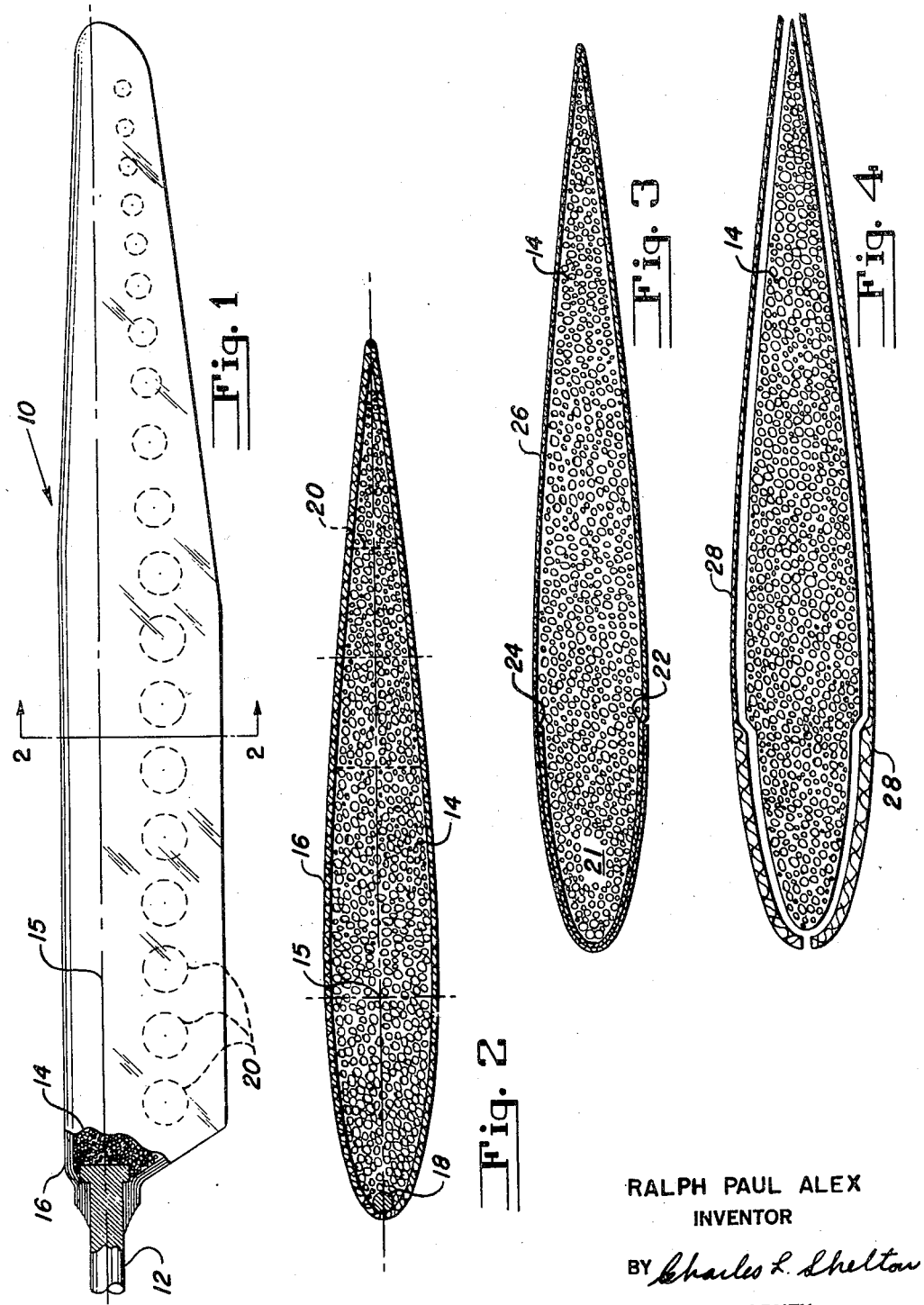
RALPH PAUL ALEX
INVENTOR
BY Charles L. Shelton
ATTORNEY Patented Oct. 11, 1949

2,484,141

UNITED STATES PATENT OFFICE 2,484,141

SKIN STRESSED LAMINATED FIBERGLAS ROTOR BLADE

Ralph Paul Alex, Stratford, Conn., assignor to United Aircraft Corporation, East Hartford, Conn., a corporation of Delaware Application January 9, 1947, Serial No. 720,975

4 Claims. (Cl. 170—159)

This invention relates to helicopters and particularly to rotor blades therefor having a cellular core section covered with laminations of resin impregnated material.

An object of this invention is to provide a rotor blade that is easy to fabricate and that may readily be repaired without endangering the structural integrity of the blade.

A further object is to provide a rotor blade having outer surfaces which are completely smooth, thereby increasing the aerodynamic efficiency.

Another object is to provide a rotor blade that is waterproof, fireproof, and immune to fungus attack, thus allowing the blade to be used in any climate and any weather.

Another object is to provide a rotor blade having great strength and resistance to buckling.

Other objects and advantages will be apparent from the specifications and claims and from the accompanying drawing which illustrates what is now considered to be the preferred embodiment of the invention.

In the drawings,

Fig. 1 is a plan view, partly in section, of a main rotor blade according to the present invention;

Fig. 2 is a view taken on section-line 2—2 of Fig. 1 and on an enlarged scale;

Fig. 3 is an exploded view illustrating one method of construction; and

Fig. 4 is an exploded view illustrating another method of construction.

Referring to the drawings, Fig. 1 shows a blade 10 constructed according to this invention and adapted to be used on the main rotor of a helicopter. While the construction shown herein refers to the main rotor blade it may readily be adapted to the tail rotor.

Fig. 2 shows a chordwise section of the blade 10 taken along section-line 2—2 of Fig. 1. The filler or core section 14 is comprised of a suitable lightweight cellular material and is covered with laminations of "Fiberglas" cloth, a well known commercial product woven in varying degrees of fineness from glass threads, bonded together by a thermosetting resin. The feathering axis 15 of the blade is approximately at the 25% chord position and lies on the extended center line of the spar 12 upon which blade 10 is mounted.

The portion of Fig. 1 which is in section shows a method of mounting the blade on the spar 12. The spar has a flanged portion at its extremity which abuts the cellular core section 14. Laminations of "Fiberglas" are applied to the spar 12 until they have been built up to the height of the flange. Laminations are then applied to the core section 14 and to the laminations on the spar 12 until the root portion of the blade is built up to the proper contour. When the laminations are bonded together the joint will be strong and the blade rigidly mounted on the spar.

The blade must be properly balanced in the chordwise position, and for this purpose a cable or other suitable weight 18 is placed in the leading edge of the airfoil section between the laminae and the core section. Lightening holes 20 are shown in the trailing portion of the section and extend completely through the core but not through the cover laminations. These holes may be eliminated, if desired, by increasing the weight of the cable in the leading edge.

The core or filler section 14 may be of suitable cellular material such as balsa wood, hard molded cellular neoprene or molded cellular cellulose acetate, or any low density non-hygroscopic material. Balsa wood has the disadvantage of inadequate supply for mass production and a wide range of densities. To construct three blades for a rotor head would necessitate having balsa of the same density in all three blades in order to achieve proper balance. It has been found that cellular cellulose acetate, or hard molded cellular neoprene are most suitable for this construction since their densities are comparatively uniform and they are readily available in sufficient quantities. Therefore, with material such as cellular cellulose acetate the weight of the blades will be uniform.

In Fig. 3, a method of fabricating the blade according to the invention is shown having a single lamina 26 in exploded position. Here the core may consist of a single molded piece or may be comprised of a multiplicity of blocks bonded together and cut to the proper configuration. The presently preferred filler shape has the general contour of the desired airfoil but has a reduced leading edge section 21 forming shoulders 22 and 24. Thermosetting resin impregnated "Fiberglas" cloth is wrapped in a fore and aft direction completely around the airfoil starting from the shoulder 24 and then is continued around the section 21 to the shoulder 22 so that the section 21 is covered by a double thickness of cloth. The next lamina to be applied is wrapped in the same fashion, starting at shoulder 24. It will be evident that the depth of the shoulders 22, 24 can be chosen so that when the desired number of layers of cloth have been applied to the airfoil, the leading edge section 21 will have been built up to provide a flush surface between this section and the remainder of the airfoil. If desired, the thickness of the laminations covering the leading edge section 21 may be increased by wrapping pieces of resin impregnated cloth around the section 21 prior to the application of laminations according to the method illustrated in Fig. 3. This would, of course, require that the height of shoulders 22, 24 be correspondingly increased. Instead of using cloth impregnated with thermosetting resin, the cloth and resin may be applied alternately as separate laminations but with this method it is harder to control the ratio of "Fiberglas" to resin.

When a suitable number of laminations have been built up, the blade may be cured by the application of heat as required to enable the resin to bond the laminae together and form a rigid structure.

Fig. 4 is an exploded view illustrating another method of fabrication wherein the top and bottom laminated sections 28 are molded separately, cured, and then applied and bonded to the core section 14 by means of a suitable agent. A final layer, or layers, of cloth may, if desired, be applied to overlie the joint on the leading edge between the sections 28 and extended aft to the trailing edge. This will insure against the possibility of the airstream peeling the sections 28 from the core 14.

Another method of construction is to form the laminations into a hollow shell and then fill the shell with the proper core material. This is done preferably by pouring or blowing the filter into the shell so the shell will act as a mold. Another method is to merely insert one piece, or a plurality of pieces, of the core material, cut to proper shape, into one end of the shell.

A blade constructed according to any of the foregoing methods may have the number of laminations varied throughout its length in accordance with variations in the stress concentrations. The core contour may be varied so that the variations in the number of laminations will not affect the contour of the finished blade. Thus, full design flexibility may be had without changing the blade contour.

If a portion of the blade should become damaged, it may be repaired by merely removing the damaged area and building up new laminations which may be cured through direct application of heat or, in some instances, by exposure to the sun. The structural integrity of the blade will not be impaired nor will the aerodynamic characteristics.

Since the exterior of this blade is perfectly smooth and free from wrinkles, the airflow over the surfaces will be free from turbulence. In addition to improved aerodynamic characteristics this blade will be up to 50% stronger than an equivalent blade of metal construction. The "Fiberglas" resin impregnated laminations are waterproof and immune to fungus attack and therefore permit the blade to be used in any weather and any climate.

It is to be understood that the invention is not limited to the specific embodiment herein illustrated and described, but may be used in other ways without departure from its spirit as defined by the following claims.

I claim:

1. In a rotor blade, a core of generally airfoil shape formed of low density material, said core having spanwise shoulders on its upper and lower faces dividing said core into leading and trailing sections, a cover of laminated material of higher density wound in a fore and aft direction about said core, and adhesive means penetrating said laminated material for bonding the laminations thereof together and to said core, said cover including a piece of material which begins at the shoulder on one of said blade faces and extends entirely around the core and again over said leading section to terminate at the other shoulder.

2. In a rotor blade, a core of generally airfoil shape formed of low density material, said core having spanwise shoulders on its upper and lower faces, a cover of laminated material of higher density wound in a fore and aft direction about said core, and adhesive means penetrating said laminated material for bonding the laminations thereof together and to said core, said cover extending from one of said shoulders forward around the entire core and then beyond said one shoulder to terminate at the other shoulder, the thickness of the material comprising said laminated material and the depth of said shoulders being such that the finished blade presents a smooth outer airfoil surface.

3. In a rotor blade, a core of generally airfoil shape formed of relatively low density material, said core having shoulders extending spanwise of its upper and lower faces at about the quarter chord section to form a leading portion of somewhat smaller airfoil section than the trailing section of the blade, a fabric cover of laminated material of higher density wound in a fore and aft direction about said core, and adhesive means penetrating said fabric for bonding the laminations thereof together and to said core, said cover including a piece of material applied to said leading core portion beginning at one shoulder and extending forward and around the entire core and again over said forward portion and terminating at the shoulder on the opposite blade face.

4. In a rotor blade, a core of generally airfoil shape formed of relatively low density material, said core having shoulders extending spanwise of its upper and lower faces at about the quarter chord section to form a leading portion of somewhat smaller airfoil section than the trailing section of the blade, a fabric cover of laminated material of higher density wound in a fore and aft direction about said core, and adhesive means penetrating said fabric for bonding the laminations thereof together and to said core, the material of said cover beginning at one shoulder and extending forward and around the entire core at least once and then again over said leading section and terminating at the other shoulder, the thickness of the laminations and the depth of said shoulders being such that the finished blade has a greater number of laminations of cover material over said leading portion than over said trailing portion and the leading section is built up to a level at which the two sections present a smooth airfoil surface.

RALPH PAUL ALEX.

REFERENCES CITED

The following references are of record in the file of this patent:

UNITED STATES PATENTS

| Number | Name | Date |
|---|---|---|
| 1,034,746 | Utzman | Aug. 6, 1912 |
| 1,507,143 | Toussaint | Sept. 2, 1924 |
| 1,999,136 | Cierva | Apr. 23, 1935 |
| 2,067,228 | Bennett | Jan. 12, 1937 |
| 2,155,375 | Jablonsky | Apr. 18, 1939 |
| 2,272,439 | Stanley | Feb. 10, 1942 |
| 2,377,846 | Dreyfus et al. | June 5, 1945 |
| 2,381,631 | Waring | Aug. 7, 1945 |
| 2,400,649 | Tarsen | May 21, 1946 |
| 2,412,908 | Platt | Dec. 17, 1946 |
| 2,414,125 | Rheinfrank | Jan. 14, 1947 |